United States Patent [19]
Pan et al.

[11] Patent Number: 5,784,116
[45] Date of Patent: Jul. 21, 1998

[54] METHOD OF GENERATING HIGH-RESOLUTION VIDEO

[75] Inventors: ShaoWei Pan, Schaumburg; Shay-Ping T. Wang, Long Grove, both of Ill.

[73] Assignee: Motorola Inc., Schaumburg, Ill.

[21] Appl. No.: 496,793

[22] Filed: Jun. 29, 1995

[51] Int. Cl.⁶ .................................................. H04N 11/20
[52] U.S. Cl. .................... 348/453; 348/448; 348/450
[58] Field of Search .................... 348/441, 443, 348/450, 448, 458, 459, 453; 345/154

[56] References Cited

U.S. PATENT DOCUMENTS

| | | | |
|---|---|---|---|
| 5,124,688 | 6/1992 | Rumball | 345/154 |
| 5,233,684 | 8/1993 | Ulichney | 345/154 |
| 5,307,164 | 4/1994 | Dong, II | 348/448 |
| 5,371,549 | 12/1994 | Park | 348/564 |
| 5,389,974 | 2/1995 | Bae | 348/555 |
| 5,534,935 | 7/1996 | Kawai et al. | 348/448 |

FOREIGN PATENT DOCUMENTS

| PCT/CA93/ | | | |
|---|---|---|---|
| 00555 | 12/1993 | WIPO | H04N 7/01 |

*Primary Examiner*—Victor R. Kostak
*Attorney, Agent, or Firm*—Michael K. Lindsey; Jeffrey G. Toler

[57] ABSTRACT

Disclosed is a method for generating a high-resolution, real-time, digital video signal from an analog composite video signal such as an NTSC, PAL, or SECAM signal. The analog video signal is digitized and consecutive fields in the signal are merged to produce a frame. Non-uniform interpolation is performed between adjacent scan lines in the frame to generate the high-resolution video signal.

29 Claims, 8 Drawing Sheets

METHOD OF GENERATING HIGH-RESOLUTION VIDEO

RELATED INVENTIONS

The present invention is related to the following inventions which are assigned to the same assignee as the present invention:

(1) "Video System and Method of Using Same", having Ser. No. 08/496,641, filed concurrently herewith; and (2) "Circuit for Interpolating Scan Lines of a Video Signal and Method of Using Same", having Ser. No. 08/496,795, filed concurrently herewith.

The subject matter of the above-identified related inventions is hereby incorporated by reference into the disclosure of this invention.

TECHNICAL FIELD

The present invention relates generally to video signal processing and, in particular, to a method for interpolating scan lines in a video signal.

BACKGROUND OF THE INVENTION

The first color television system was developed in the United States, and in December 1953 the Federal Communications Commission (FCC) approved the transmission standard. Most of the work for developing a color transmission standard was done by the National Television System Committee (NTSC). The NTSC standard provides a format for broadcasting a video signal having 525 scan lines (485 representing pixels), 60 fields/second, and 2:1 interlacing. Television broadcasts in the United States, Japan, and many other countries currently adhere to the NTSC standard.

The European equivalent of the NTSC standard is the Phase Alternation Line (PAL) standard that calls for 625 scan lines, 50 fields/second, and 2:1 interlacing. Another European standard, SECAM, was developed in France during the 1960s. Like PAL, SECAM is a 625 scan line, 50 field/second, 2:1 interlaced system.

The three standards, NTSC, PAL, and SECAM, provide analog video sources having an interlaced display format, i.e., each frame of video is scanned out as two fields that are separated temporally and offset spatially in the vertical direction. FIG. 1 illustrates the temporal separation of the fields in an interlaced video signal. The video signal consists of a sequence of alternating even and odd fields separated by a period of time for synchronizing the fields. The even field contains every other scan line in the frame, or the even-numbered scan lines, while the odd field contains the odd-number scan lines. Thus, an NTSC field contains 262.5 scan lines. FIG. 2 shows an example of a raster displaying an odd field.

FIG. 3 shows an example of a waveform of an NTSC composite video signal. The waveform shown represents two scan lines. The waveform includes a horizontal sync pulse 50 and a color burst 52 for each scan line.

There has been much discussion concerning the introduction of new television standards, such as high-definition television (HDTV), to improve the quality of transmitted images and audio. New transmission standards will require a substantial investment in new equipment by both broadcasters and consumers. A television receiver which performs as well as an HDTV set under the present broadcasting standards would effectively achieve the same goal as the proposed standards without requiring consumers and broadcasters to pay an enormous conversion cost.

Thus, there is a need for a video system and method that generates high definition images from video signals broadcast using standard television transmission formats, such as NTSC, PAL, or SECAM.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It is an advantage of the present invention to provide a method for generating a video signal which improves the definition of an image represent by a video signal. It is a further advantage of the present invention to provide a method which processes video signals that are based on current television transmission standards, thus allowing high quality images to be derived from conventional television broadcasts.

Figure 1:
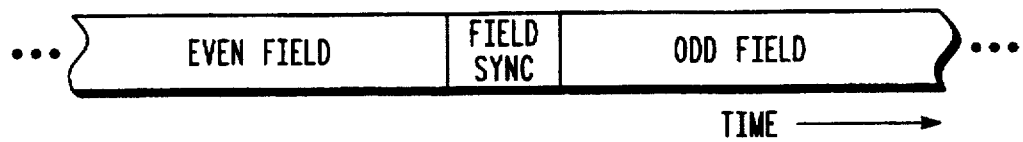
FIG. 1 illustrates a temporal block diagram of an interlaced video signal.
Figure 2:
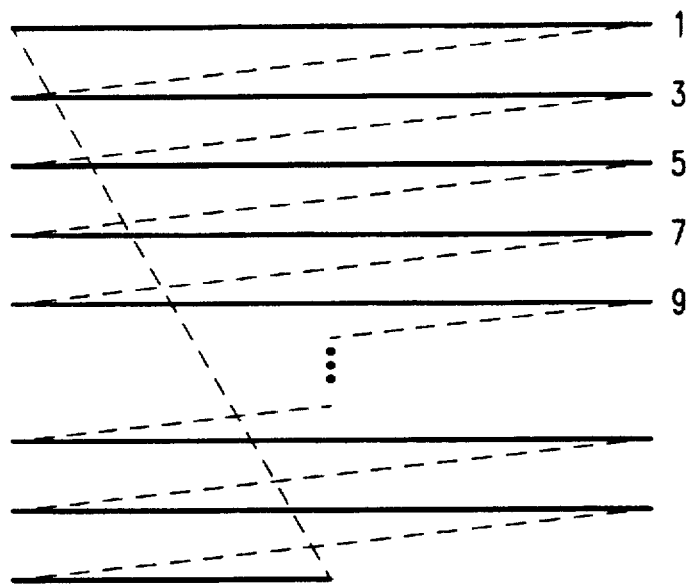
FIG. 2 illustrates a graphical representation of a raster represented by the interlaced video signal of FIG. 1.
Figure 3:
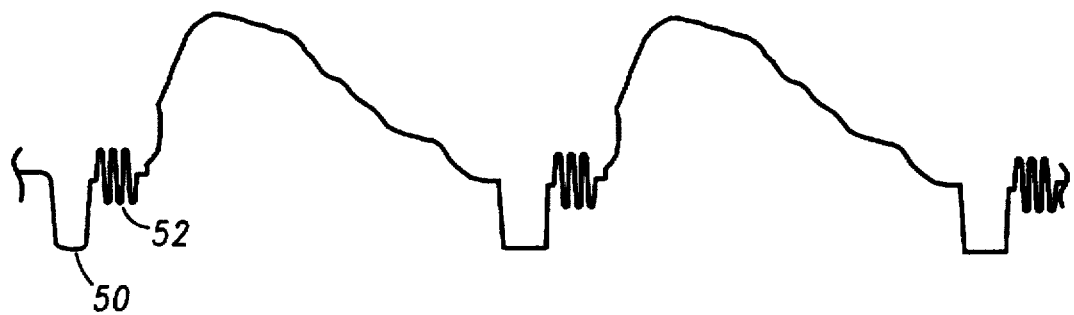
FIG. 3 illustrates a graphical representation of a waveform segment of an NTSC video signal.
Figure 4:
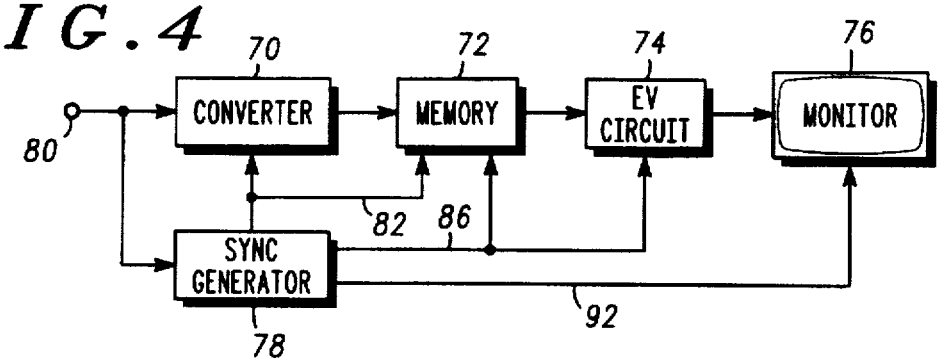
FIG. 4 illustrates a block diagram representation of a first version of a video system employing an enhanced-video circuit that is in accordance with an embodiment of the present invention.

Referring now to FIG. 4, a first video system employing a method that is in accordance with an embodiment of the present invention is shown. The video system includes a converter 70, a memory 72, an enhanced-video circuit 74, a monitor 76, and a sync generator 78. The converter 70 provides a means for converting a video signal 80 to a plurality of color space signals. The format of the video signal 80 can be based on conventional standards for television transmission, such as NTSC, PAL, or SECAM. The color space signals can be construed as binary words that represent values in a given color space, such as a YIQ, YUV, or RGB color space. The color space signals are passed from the converter 70 to the memory 72. The memory 72 stores the plurality of color space signals corresponding to an input frame, and, in turn, provides the color space signals as output. The enhanced-video circuit 74 receives color space signals from the memory 72 and performs non-uniform interpolation between adjacent color space signals. As a result of performing the non-uniform interpolation, the enhanced-video circuit 74 generates a plurality of interpolated pixel signals which represent an output frame having a greater number of horizontal scan lines than the input frame. The interpolated pixel signals can be construed as binary words representing values in the same color space as the color space signals.

The sync generator 78 generates a sync trigger signal 86, a sampling signal 82, and a field sync signal 92. All of these signals are generated from the video signal 80. The sync trigger signal 86 is distributed to the memory 72 and the enhanced-video circuit 74 for coordinating the transfer of the color space signals from the memory 72 to the enhanced-video circuit 74. The sampling signal 82 synchronizes the operations of the converter 70 and the memory 72. If the video signal 80 is an NTSC signal, the frequencies of the sampling signal 82, the sync trigger signal 86, and the field sync signal 92 are approximately 12.27 MHz, 24.54 MHz, and 60 Hz, respectively.

The monitor 76 displays an image represented by the interpolated pixel signals that it receives from the enhanced-video circuit 74. Generally, the monitor 76 is any means for receiving and displaying a visual image represented by an electronic signal. For instance, the monitor 76 could include a consumer TV, a projection TV, a computer monitor, or a liquid crystal display (LCD).

Figure 5:
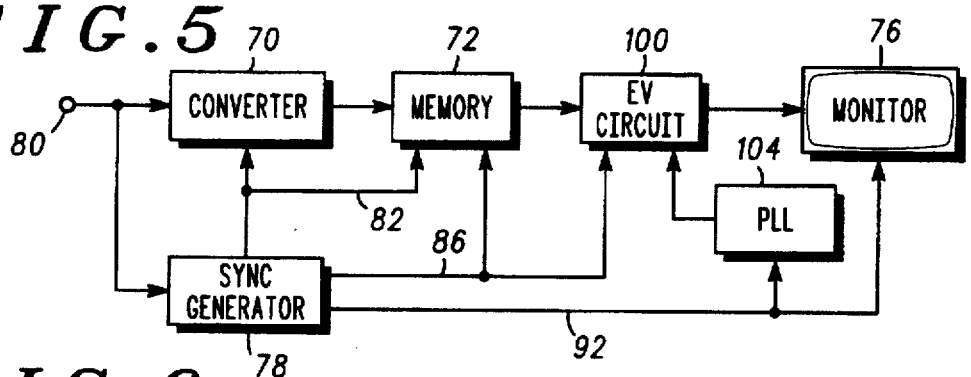
FIG. 5 illustrates a block diagram representation of a second version of a video system employing a method that is in accordance with an embodiment of the present invention.

FIG. 5 illustrates a second version of a video system employing a method that is in accordance with an embodiment of the present invention. The video system includes the converter 70, memory 72, sync generator 78, and monitor 76 shown in FIG. 4. In addition, the preferred video system includes a PLL 104 (phase locked loop) and an enhanced-video circuit 100 which allow the video system to vary the number of horizontal scan lines in the output frame. The PLL 104 generates at least one high-band sync signal from the field sync signal 92. The PLL 104 can be either an analog or digital PLL. The PLL 104 provides the high-band sync signal to the enhanced-video circuit 100. The high-band sync signal is used to transfer interpolated pixel signals from the enhanced video circuit 100.

Figure 6:
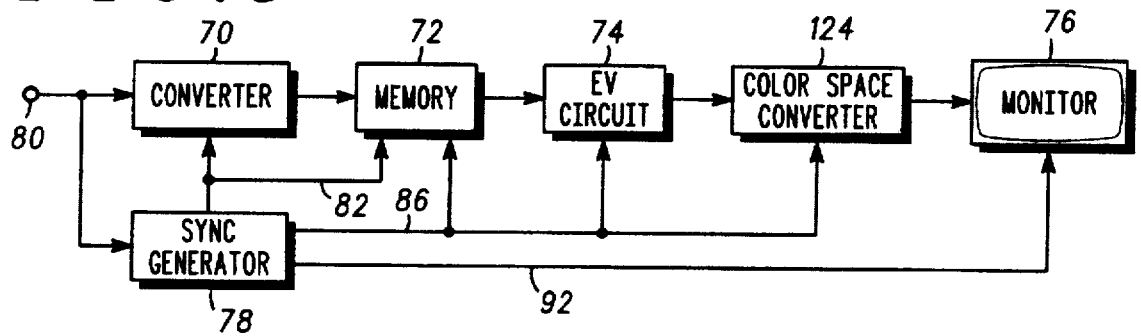
FIG. 6 illustrates a block diagram representation of a third version of a video system employing a method that is in accordance with an embodiment of the present invention.

FIG. 6 illustrates a third version of a video system employing a method that is in accordance with an embodiment of the present invention. Like the video system in FIG. 4, the video system of FIG. 6 includes the converter 70, the memory 72, the enhanced-video circuit 74, the sync generator 78, and the monitor 76. However, in addition to these elements, the video system of FIG. 6 includes a color space converter 124 for converting the interpolated pixel signals from the enhanced-video circuit 74 into a plurality of output format signals. The output format signals are passed to the monitor 76 which in response displays an image represented by the signals. Examples of possible output format signals are RGB signals and YCrCb signals. The color space converter 124 is useful when the color spaces of the color space signals and the monitor 76 are different. For example, the converter 70 may generate as output a plurality of YUV signals, whereas the monitor 76 responses to RGB signals. In this circumstance, the color space converter 124 would convert the YUV signals to corresponding RGB signals.

Figure 7:
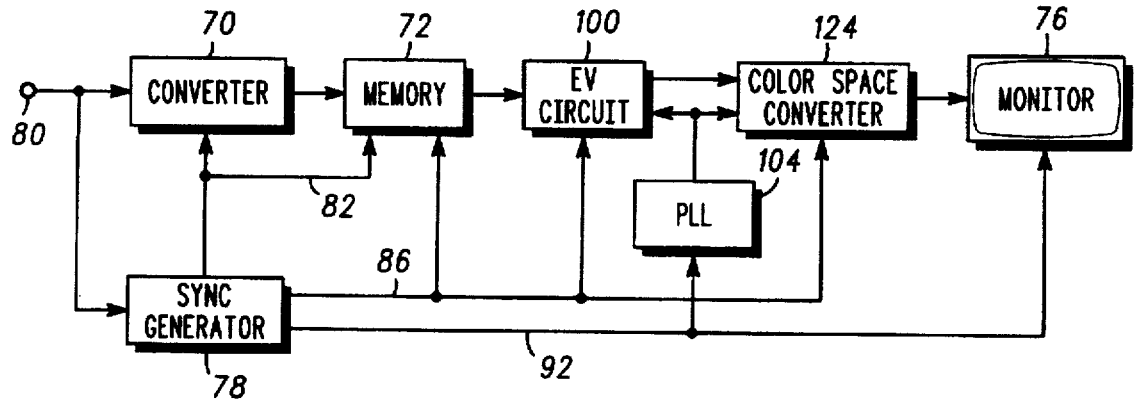
FIG. 7 illustrates a block diagram representation of a fourth version video system employing a method that is in accordance with an embodiment of the present invention.

FIG. 7 illustrates a fourth version of a video system employing a method that is in accordance with an embodiment of the present invention. This version of the video system includes the converter 70, memory 72, sync generator 78, monitor 76, enhanced-video circuit 100, and PLL 104 as shown in FIG. 5. In addition, the video system includes the color space converter 124 for converting the interpolated pixel signals from the enhanced-video circuit 100 into a plurality of output format signals. The output format signals are passed to the monitor 76 which in response displays an image represented by the signals. Examples of possible output format signals are RGB signals and YCrCb signals.

The enhanced video circuit 100 and the PLL 104 allow the video system to vary the number of scan lines in the output frame. The PLL 104 generates at least one high-band sync signal from the field sync signal 92. The high-band sync signal is phase-locked to the field sync signal and has a frequency which is a multiple of the field sync signal. The PLL 104 provides the high-band sync signal to the enhanced-video circuit 100 and the color space converter 124.

Figure 8:
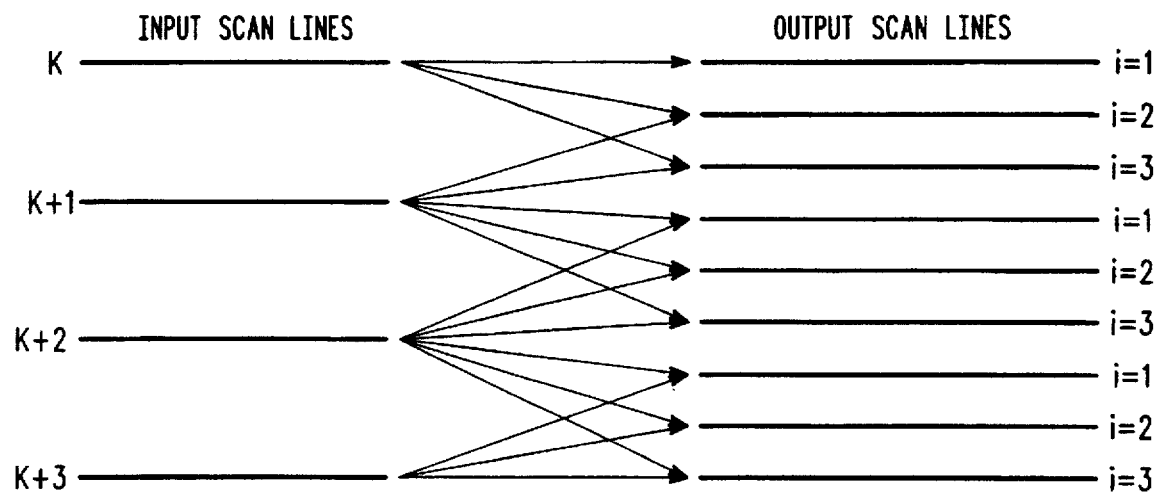
FIG. 8 conceptually illustrates non-uniform interpolation performed in accordance with an embodiment of the present invention.

FIG. 8 conceptually illustrates non-uniform interpolation performed in accordance with an embodiment of the present invention. The video signal 80 received by the video system comprises a plurality of scan lines, four of which are shown in FIG. 8. Each scan line includes a plurality of color space signals. The input scan lines are indexed, from k to k+1, according to their relative vertical positions in a frame. The video system processes the input video signal to generate a corresponding plurality of output scan lines. Each output scan line includes a plurality of interpolated pixel signals. In the example shown, the color space signals in each pair of adjacent scan lines are interpolated to produce three output scan lines of interpolated pixel signals. For instance, input scan lines k and k+1 constitute an adjacent pair of scan lines, and thusly contain a plurality of adjacent color space signals. The three upper-most output scan lines are generated from input scan lines k and k+1 using non-uniform interpolation. The output scan lines are depicted as being equally spaced; however, non-uniform interpolation can also be used to generate output scan lines having irregular spacing. Furthermore, an adjacent pair of input scan lines can be non-uniformly interpolated to generate any number of corresponding output scan lines. For example, an NTSC signal, which has approximately 485 scan lines per frame can be non-uniformly interpolated to generate output frames having 700, 800, 900, 1000, 1200, or 1920 scan lines.

Figure 9:
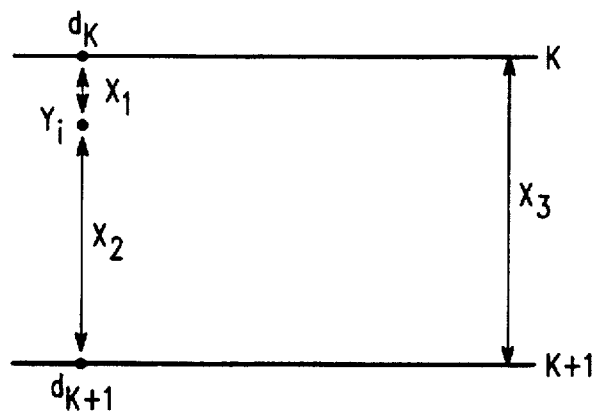
FIG. 9 illustrates a graphical representation of linear, non-uniform interpolation performed in accordance with an embodiment of the present invention.

FIG. 9 illustrates linear, non-uniform interpolation performed in accordance with an embodiment of the present invention. It will be apparent to one of ordinary skill in the art that linear interpolation is a special case of non-linear interpolation. Linear, non-uniform interpolation is based on a function:

$$y_i = c_{1ik} * d_k + c_{2ik} * d_{k+1} \quad \text{Equation 1}$$

where $y_i$ represents an interpolated pixel signal; $d_k$ and $d_{k+1}$ represent a pair of adjacent color space signals; $c_{1ik}$ represents a first coefficient; $c_{2ik}$ represents a second coefficient; and i and k are integer indices corresponding to the output scan lines and the input scan lines, respectively. The coefficients can be construed as being weight values where $C_{1ik} + c_{2ik} = 1$, and $0 \leq c_{1ik} \leq 1$ and $0 \leq c_{2ik} \leq 1$. In FIG. 9, the interpolated pixel signal $y_i$ corresponds to adjacent color space signals $d_1$ and $d_2$ located in input scan lines k and k+1, respectively. The variables $x_1$, $x_2$, and $x_3$ represent distances. The coefficients are determined as follows:

$$c_{1ik} = x_1/x_3 \quad \text{Equation 2}$$

$$c_{2ik} = x_2/x_3 \quad \text{Equation 3}$$

Figure 10:
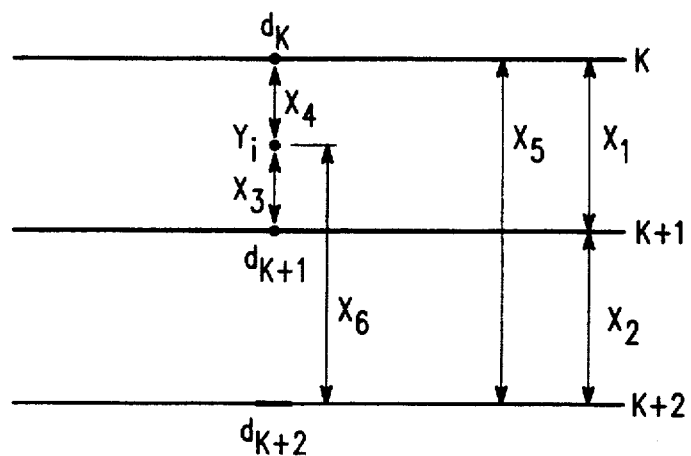
FIG. 10 illustrates a graphical representation of non-linear, non-uniform interpolation performed in accordance with an embodiment of the present invention.

FIG. 10 illustrates non-linear, non-uniform interpolation performed in accordance with an embodiment of the present invention. FIG. 10 depicts 2nd-order non-linear interpolation based on a function:

$$y_i = c_{1ik} * d_k + c_{2ik} * d_{k+1} + c_{3ik} * d_{k+2} \quad \text{Equation 4}$$

where $y_i$ represents an interpolated pixel signal; $d_k$, $d_{k+1}$, and $d_{k+2}$ represent three successive adjacent color space signals; $c_{1ik}$ represents a first coefficient; $c_{2ik}$ represents a second coefficient; $c_{2ik}$ represents a second coefficient; and i and k are integer indices corresponding to the output scan lines and the input scan lines, respectively. The coefficients can be construed as being weight values. Although FIG. 10 represents 2nd-order non-linear interpolation, an embodiment of the present invention can use any $n^{th}$-order non-linear interpolation. In addition, the non-linear interpolation can be based on an $n^{th}$-order polynomial expansion.

In FIG. 10, the interpolated pixel signal $y_i$ corresponds to adjacent color space signals $d_1$, $d_2$, and $d_3$ located in input scan lines k, k+1, and k+2, respectively. Essentially, a quadratic interpolation function is applied to the three adjacent color space signals to obtain the interpolated pixel signal. The variables $x_1$, $x_2$, $x_3$, $x_4$, $x_5$, and $x_6$ represent distances. The coefficients are determined as follows:

$$c_{1ik} = (x_6 * x_3)/(x_5 * x_1) \quad \text{Equation 5}$$

$$c_{2ik} = (x_6 * x_4)/(x_2 * x_1) \quad \text{Equation 6}$$

$$c_{3ik} = (x_4 * x_3)/(x_5 * x_2) \quad \text{Equation 7}$$

Figure 11:
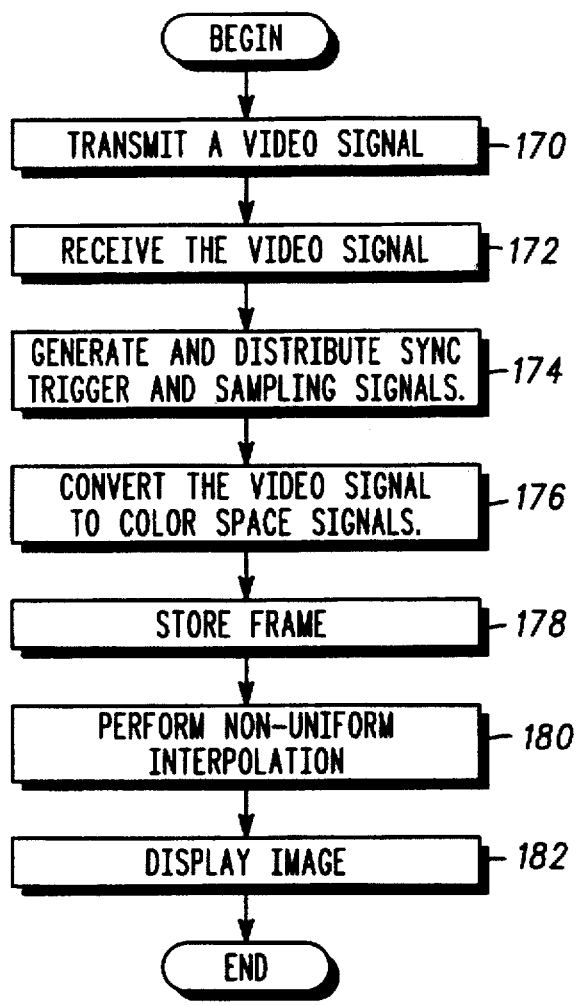
FIG. 11 illustrates a flow diagram of a method of using the video systems shown in FIGS. 4–7.

FIG. 11 illustrates a flow diagram of a method of using the video systems shown in FIGS. 4–7 to process a video signal. In box 170, the video signal 80 is transmitted to at least one receiver. In box 172, the video signal is received by a receiver. The receiver incorporates a video system which embodies the present invention. For instance, the receiver could be a consumer TV, projection TV, computer monitor, liquid crystal display (LCD) TV, LCD computer monitor, or any other means for receiving and displaying a visual image represented by an electronic signal.

In box 174, the sync trigger signal 86 and sampling signal 82 are generated from the video signal 80. The sync trigger signal 86 is then distributed to the memory 72 and the enhanced-video circuit 74, 100 to coordinate the transfer of the color space signals from the memory 72 to the enhanced-video circuit 74, 100. Also, the sampling signal 82 is distributed to the converter 70 and the memory 72 to synchronize their operations.

In box 176, the video signal 80 is converted to the plurality of color space signals representing an input frame. Next, in box 178, the color space signals representing the input frame are stored in the memory 72. Although the memory 72 could be made large enough to store the color space signals of an entire frame, one of ordinary skill in the art will realize that if the video signal 80 is interlaced with two fields, then the memory 72 needs only to store the color space signals corresponding to one of the fields.

In box 180, non-uniform interpolation between adjacent color space signals is performed to generate a plurality of interpolated pixel signals which represent an output frame having a greater number of scan lines than the input frame. The non-uniform interpolation can be based on either linear or non-linear interpolation.

In box 182, an image represented by the interpolated pixel signals is displayed by the monitor 76.

Figure 12:
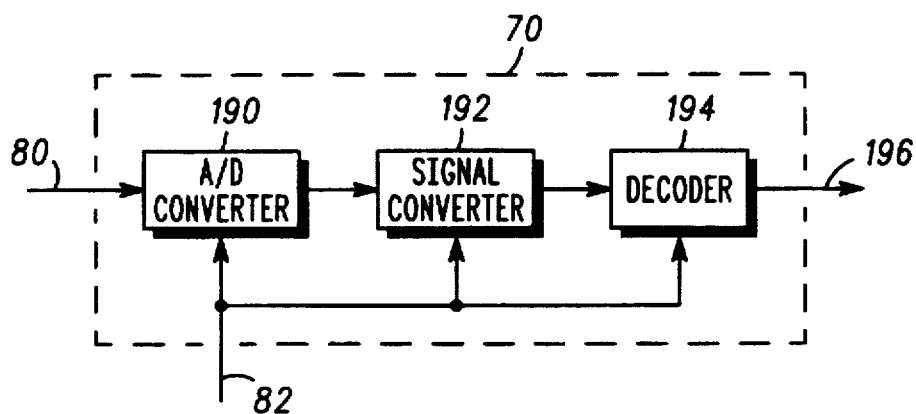
FIG. 12 is a detailed block diagram of the converter shown in FIGS. 4–7.

FIG. 12 is a detailed block diagram of the converter 70 shown in FIGS. 4–7. The converter 70 includes an A/D converter 190, a signal converter 192, and a decoder 194. The A/D converter 190 digitizes the video signal 80 into a corresponding plurality of binary-coded signals. The signal converter 192, which is responsive to the binary-coded signals, generates a plurality of chrominance signals and a plurality of luminance signals. Upon receiving the chrominance and luminance signals, the decoder 194 generates the corresponding color space signals. The operations of the A/D converter 190, the signal converter 192, and the decoder 194 are synchronized by the sampling signal 82.

Figure 13:
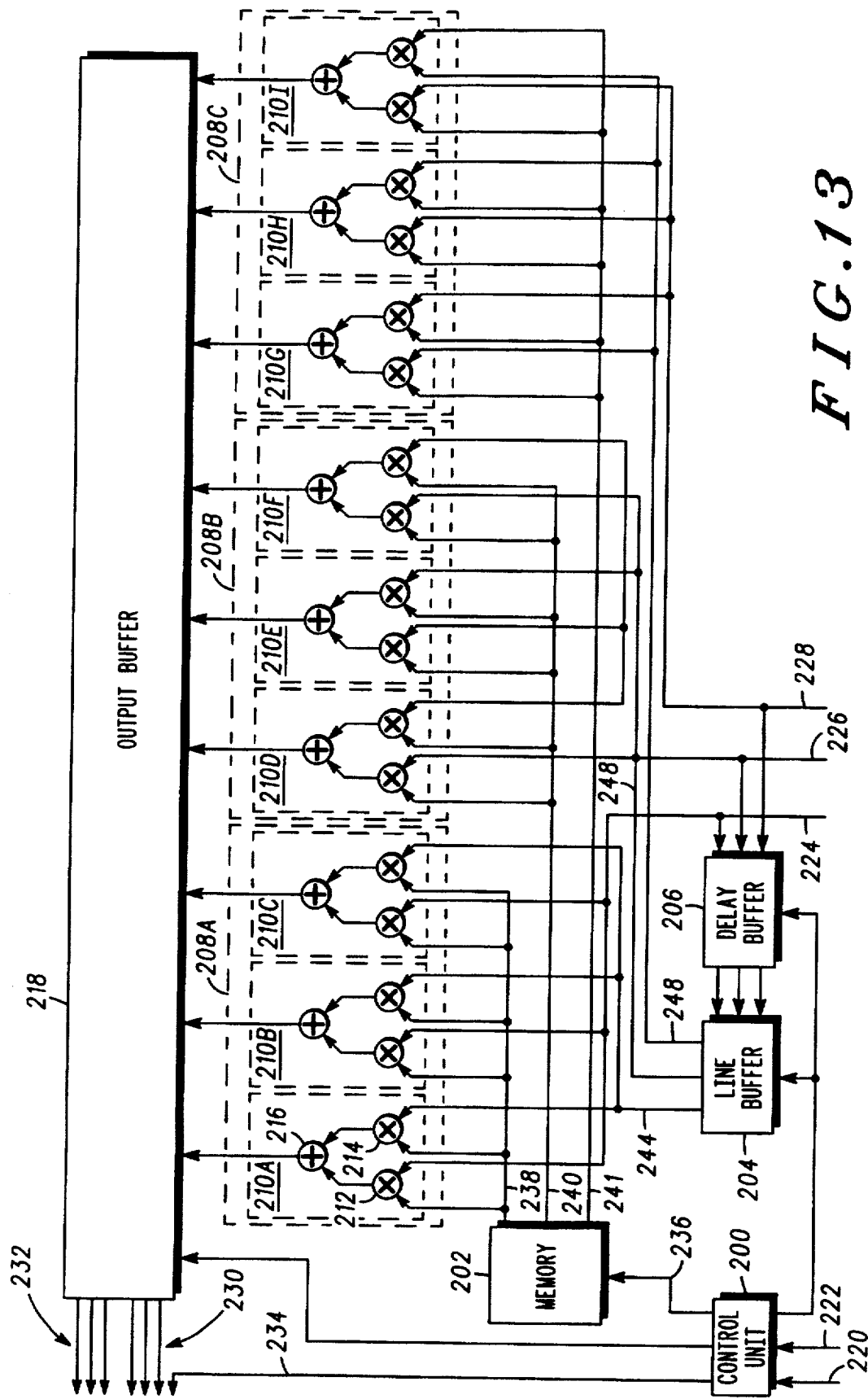
FIG. 13 is a detailed block diagram of the enhanced-video circuit shown in FIGS. 4–7.

FIG. 13 is a detailed block diagram of one version of the enhanced-video circuits 74, 100 shown in FIGS. 4–7. This version of the enhanced-video circuit can be used to compute non-uniform interpolations based on the function given in Equation 1. The enhanced-video circuit comprises a plurality of interpolation circuits 208 a–c, a memory 202, a control unit 200, a line buffer 204, a delay buffer 206, and an output buffer 218. Although the enhanced-video circuit may include any number of interpolation circuits, it typically includes one interpolation circuit per component color. For example, only one interpolation circuit would be needed to perform non-uniform interpolation on a monochromatic video signal. The exemplary enhanced-video circuit shown in FIG. 13 is intended to process a video signal having up to three color components, such as an RGB signal; thus, the circuit includes three interpolation circuits 208 a–c.

Although it will be realized by one skilled in the art that the enhanced-video circuit is capable of performing non-uniform interpolation with any format of component video signals, the following discussion referring to FIGS. 11 and 12 will use, as an example, RGB signals to illustrate the functions of the various versions of the enhanced-video circuit.

The interpolation circuits 208a–c generate a plurality of interpolated pixel signals in response to a plurality of color space signals received on a data input bus. The data input bus includes a red bus 224, a green bus 226, and a blue bus 228. In the example shown, the red interpolation circuit 208a receives color space signals representing the red component of an RGB signal over the red bus 224; the green interpolation circuit 208b receives color space signals representing the green component of an RGB signal over the green bus 226; and the blue interpolation circuit 208c receives color space signals representing the blue component of an RGB signal over the blue bus 228.

Each interpolation circuit performs non-uniform interpolation between adjacent color space signals and includes at least one arithmetic circuit 210a–i for computing the non-uniform interpolation. Although an interpolation circuit may comprise any number of arithmetic circuits, in the given example each interpolation circuit includes three arithmetic circuits. Each arithmetic circuit includes a first multiplier, a second multiplier, and an adder for producing an interpolated pixel signal. For instance, the red interpolation circuit 208a includes three red arithmetic circuits 210a–c; the green interpolation circuit 208b includes three green arithmetic circuits 210d–f; and the blue interpolation circuit 208c includes three blue arithmetic circuits 210g–i.

The function of the arithmetic circuits 210a–i can be illustrated by referring to the first red arithmetic circuit 210a. As shown, the first red arithmetic circuit 210a includes a first multiplier 212, a second multiplier 214, and an adder 216. The first multiplier 212 multiplies a red component signal received on the red bus 224 with a coefficient to produce a first product signal. The second multiplier 214 multiplies a stored red component with a coefficient to produce a second product signal. The adder 216 sums the first and second product signals to generate an interpolated red pixel signal. The coefficients typically have different values; however, under some circumstances, such as generating output scan lines that are equidistant from the input scan lines, they may have the same value.

The memory 202 provides a means for storing coefficients and provides at least one coefficient to the interpolation circuits 208a–c. In the example shown, coefficients used in non-uniform interpolation of color space signals in the red component are passed across a red memory bus 238; coefficients used in non-uniform interpolation of color space signals in the green component are passed across a green memory bus 240; and coefficients used in non-uniform interpolation of color space signals in the blue component are passed across a blue memory bus 242.

The control unit 200 generates an address 236 usable by the memory 202 to retrieve at least one coefficient. The control unit 200 generates the address 236 in response to receiving a scan line address 222 corresponding to the adjacent color space signals being interpolated. The control unit 200 is programmable to vary the number of scan lines represented the interpolated pixel signals. This is accomplished by the control unit 200 receiving an instruction 220 and then decoding the instruction to select a different address offset value which is included in the address 236. The address offset essentially points to a different memory space containing another set of coefficients. In one version of the enhanced-video circuit, the memory 202 stores sets of coefficients to generate output frames having 700, 800, 900, 1000, 1200, or 1920 scan lines.

The control unit 200 can also generate control signals which are passed to the line buffer 204, delay buffer 206, and output buffer 218. Such control signals can be used to coordinate the transfer of data, or they can also be used to initialize or reset the buffers. Additionally, the control unit 200 generates an output sync signal 234 which is used for transferring data across a first output bus 230 or a second output bus 232.

The line buffer 204 and the delay buffer 206 constitute a buffer for storing color space signals corresponding to a scan line. The delay buffer 206 receives a sequence of color space signals representing a scan line. Upon receiving an a sequence corresponding to a complete scan line, the delay buffer transfers its contents to the line buffer 204. At this point, the delay buffer 206 begins storing color space signal of the next scan line and the line buffer 204 holds the color space signals of the previously completed scan line. The color space signals stored in the line buffer 204 are distributed to the interpolation circuits 208a–c across their respective buffer bus. A red buffer bus 244 connects the line buffer 204 to the red interpolation circuit 208a. A green buffer bus 246 connects the line buffer 204 to the green interpolation circuit 208b. A blue buffer bus 248 connects the line buffer 204 to the red interpolation circuit 208c. In essence, the line buffer 204 and the delay buffer 206 act as a double-buffer that stores color space signals of adjacent scan lines.

The output buffer 218 receives interpolated pixel signals from the interpolation circuits 208a–c and transmits interpolated pixel signals of a current output scan line on the output buses 230–232. Interpolated pixels that are not part of the current output scan line are temporarily stored in the output buffer 218. Each of the output buses 230–232 can concurrently transmit the red, blue, and green interpolated pixel signals the RGB signal. Two output buses are provided to increase the bandwidth of the output. Generally, the output scan lines are transmitted at a higher frequency than the input scan lines.

The output buffer 218 may optionally include a means (not shown) for interpolating between adjacent pixels within a scan line to produce a greater number of pixels in the output scan line. Interpolation performed in the output buffer 218 may be either linear or non-linear non-uniform interpolation. For example, the interpolation may be based on either Equation 1 or 4. In one embodiment of the present invention, the means for interpolating generates horizontally interpolated pixels by simply averaging two adjacent pixels. By interpolating within scan lines, i.e., performing-two-dimensional interpolation, the definition of an image represented by the video signal can be further enhanced.

Figure 14:
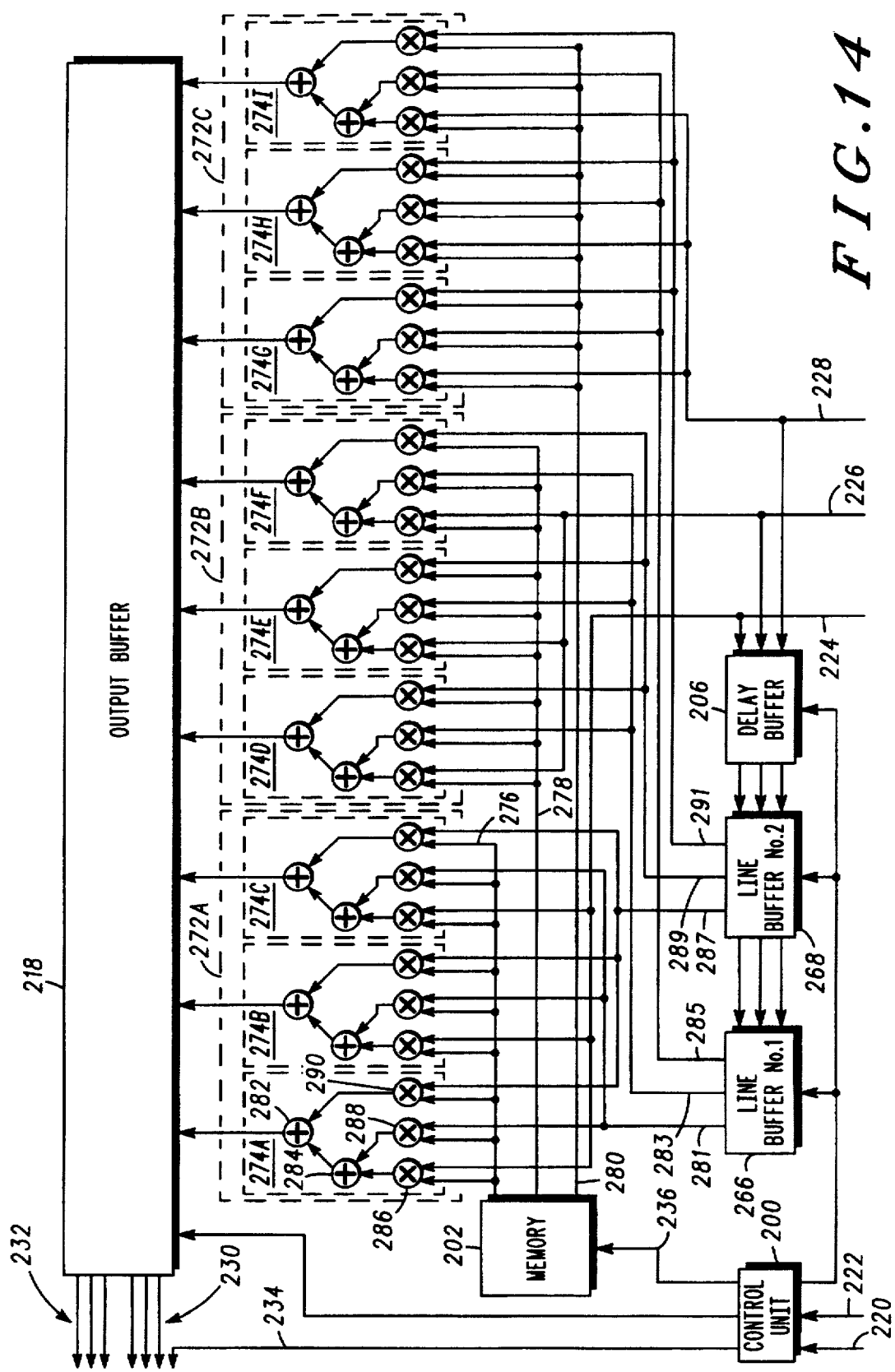
FIG. 14 is a detailed block diagram of an alternative version of the enhanced-video circuit shown in FIGS. 4–7 in accordance with one embodiment of the present invention.

FIG. 14 is a detailed block diagram of an alternative version of the enhanced-video circuit shown in FIGS. 4–7. This version of the enhanced-video circuit can be used to compute non-uniform interpolations based on the function given in Equation 4. The enhanced-video circuit comprises a plurality of interpolation circuits 272a–c, a memory 202, a control unit 200, a first line buffer 266, a second line buffer 268, a delay buffer 206, and an output buffer 218. Although the enhanced-video circuit may include any number of interpolation circuits, it typically includes one interpolation circuit per component color. For example, only one interpolation circuit would be needed to perform non-uniform interpolation on a monochromatic video signal. The exemplary enhanced-video circuit shown in FIG. 14 is intended to process a video signal having up to three color components, such as an RGB signal; thus, the circuit includes three interpolation circuits 272a–c.

The interpolation circuits 272a–c generate a plurality of interpolated pixel signals in response to a plurality of color space signals received on data input bus. Each of the interpolation circuits 272a–c is capable of concurrently generating up to three interpolated pixel signals. The data input bus includes a red bus 224, a green bus 226, and a blue bus 228. In the example shown, the red interpolation circuit 272a receives color space signals representing the red component of an RGB signal over the red bus 224; the green interpolation circuit 272b receives color space signals representing the green component of an RGB signal over the green bus 226; and the blue interpolation circuit 272c receives color space signals representing the blue component of an RGB signal over the blue bus 228.

Each interpolation circuit performs a non-linear, non-uniform interpolation between adjacent color space signals and includes at least one arithmetic circuit 274a–i for computing the non-uniform interpolation. Although an interpolation circuit may comprise any number of arithmetic circuits, in the given example each interpolation circuit includes three arithmetic circuits. Each arithmetic circuit includes a first multiplier, a second multiplier, a third multiplier, a first adder, and a second adder for producing an interpolated pixel signal. For instance, the red interpolation circuit 272a includes three red arithmetic circuits 274a–c; the green interpolation circuit 272b includes three green arithmetic circuits 274d–f; and the blue interpolation circuit 272c includes three blue arithmetic circuits 274g–i.

The function of the arithmetic circuits 274a–i can be illustrated by referring to the first red arithmetic circuit 274a. As shown, the first red arithmetic circuit 274a includes a first multiplier 286, a second multiplier 288, a third multiplier 290, a first adder 284, and a second adder 282. The first multiplier multiplies a red component signal with a coefficient to produce a first product signal. The second multiplier 288 multiplies a first stored red component with a coefficient to produce a second product signal. The first adder 284 sums the first product signal and the second product signal to generate a first sum signal. The third multiplier 290 multiplies a second stored red component signal with a coefficient to generate a third product signal. The second adder 282 sums the first sum signal and third product signal to produce an interpolated red pixel signal. The coefficients typically have different values; however, under some circumstances, such as generating output scan lines that are equidistant from the input scan lines, they may have the same value.

The memory 202 provides a means for storing coefficients and provides at least one coefficient to the interpolation circuits 272a–c. In the example shown, coefficients used in non-linear, non-uniform interpolation of color space signals in the red component are passed across a red memory bus 276, while coefficients for color space signals in the green component are passed across a green memory bus 278, and coefficients for color space signals in the blue component are passed across a blue memory bus 280.

The control unit 200 generates an address 236 usable by the memory 202 to retrieve at least one coefficient. The control unit 200 generates the address 236 in response to receiving a scan line address 222 corresponding to the adjacent color space signals being interpolated. The control unit 200 is programmable to vary the number of scan lines represented the interpolated pixel signals. This is accomplished by the control unit 200 receiving an instruction 220 and then decoding the instruction to select a different address offset value which is included in the address 236. The address offset essentially points to a different memory space containing another set of coefficients. In one version of the enhanced-video circuit, the memory 202 stores sets of coefficients to generate output frames having 700, 800, 900, 1000, 1200, or 1920 lines per frame.

The control unit 200 can also generate control signals which are passed to the first line buffer 266, second line buffer 268, delay buffer 206, and output buffer 218. Such control signals can be used to coordinate the transfer of data, or they can also be used to initialize or reset the buffers. Additionally, the control unit 200 generates an output sync signal 234 which is used for transferring data across a first output bus 230 or a second output bus 232.

The first line buffer 266, the second line buffer 268, and the delay buffer 206 constitute a buffer for storing color space signals corresponding to three consecutive scan lines. The delay buffer 206 receives a sequence of color space signals representing a scan line. Upon receiving a sequence corresponding to a complete scan line, the delay buffer 206 transfers its contents to the second line buffer 268. At this point, the delay buffer 206 begins storing color space signal of the next scan line and the second line buffer 268 holds the color space signals of the previously completed scan line. Upon receiving the next scan line, the contents of the second line buffer 268 are shifted to the first line buffer 266 and the contents of the delay buffer are shifted into the second line buffer 268. At this point, the first and second line buffer contain the color space signals of two adjacent scan lines. The color space signals stored in the first line buffer 266 and the second line buffer 268 are distributed to the interpolation circuits 272a–c across their respective buffer bus. A first red buffer bus 281 connects the first line buffer 266 to the red interpolation circuit 272a, whereas a second red buffer bus 287 connects the second line buffer 268 to the red interpolation circuit 272a. A first green buffer bus 283 connects the first line buffer 266 to the green interpolation circuit 272b, whereas a second green buffer bus 289 connects the second line buffer 268 to the green interpolation circuit 272b. A first blue buffer bus 285 connects the first line buffer 266 to the blue interpolation circuit 272c, whereas a second blue buffer bus 291 connects the second line buffer 268 to the blue interpolation circuit 272c. In essence, the first line buffer 266, the second line buffer 268, and the delay buffer 206 act as a triple-buffer that stores color space signals of three adjacent scan lines.

The output buffer 218 receives interpolated pixel signals from the interpolation circuits 272a–c and transmits interpolated pixel signals of a current output scan line on the output buses 230–232. Interpolated pixels that are not part of the current output scan line are temporarily stored in the output buffer 218. Each of the output buses 230–232 can concurrently transmit the red, blue, and green interpolated pixel signals the RGB signal. Two output buses are provided to increase the bandwidth of the output. Generally, the output scan lines are transmitted at a higher frequency than the input scan lines.

The output buffer 218 may optionally include a means (not shown) for interpolating between adjacent pixels within a scan line to produce a greater number of pixels in the output scan line. Interpolation performed in the output buffer 218 may be either linear or non-linear non-uniform interpolation. In one embodiment of the present invention, the means for interpolating generates horizontally interpolated pixels by simply averaging two adjacent pixels. By interpolating within scan lines, i.e., performing two-dimensional interpolation, the definition of an image represented by the video signal can be further enhanced.

Although the enhanced-video circuit of the present invention is preferably implemented as an integrated circuit, such as an ASIC, it will be understood by one of ordinary skill in the art that the enhanced-video circuit of the present invention may be implemented in either hardware or software, or any combination thereof.

Figure 15:
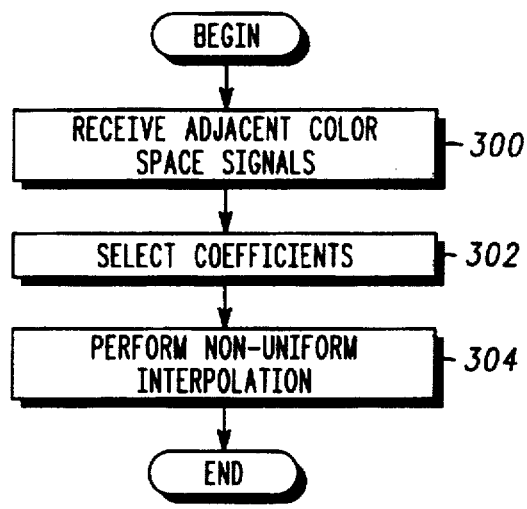
FIG. 15 is a flow diagram of a method of using the enhanced-video circuits shown in FIGS. 13–14.

FIG. 15 is a flow diagram of a method of using the enhanced-video circuits shown in FIGS. 13–14 to generate a plurality of interpolated pixel signals. In box 300, a plurality of adjacent color space signals is received on the data input bus.

In box 302, at least one coefficient corresponding to the adjacent color space signals is select from the memory 202.

This is accomplished when the scan line address 222 corresponding to the adjacent color space signals is received and decoded by the control unit 200 to generate the address 236. The coefficients stored at the address 236 are then retrieved from the memory 202. By decoding the instruction 220, the control unit 200 can produce an address offset which is used to select a different set of coefficients. By selecting a different set of coefficients, the control unit 200 can, in effect, select a different number of scan lines represented by the interpolated pixel signals.

In box 304, non-uniform interpolation is performed between the adjacent color space signals using the retrieved coefficients to generate the plurality of interpolated pixel signals. The enhanced-video circuit shown in FIG. 13 performs linear interpolation which is based on the function given in Equation 1, while the enhanced-video circuit shown in FIG. 14 performs 2nd-order non-linear interpolation which is based on the function given in Equation 4.

It will be realized by one of ordinary skill in the art that the concept of an enhanced-video circuit can be extended to include an arithmetic circuit that performs non-linear interpolation having an order higher than two. For instance, the interpolation circuits 272a–c shown in FIG. 14 could include arithmetic circuits that implement a third-order, fourth-order, or fifth-order interpolation.

Figure 16:
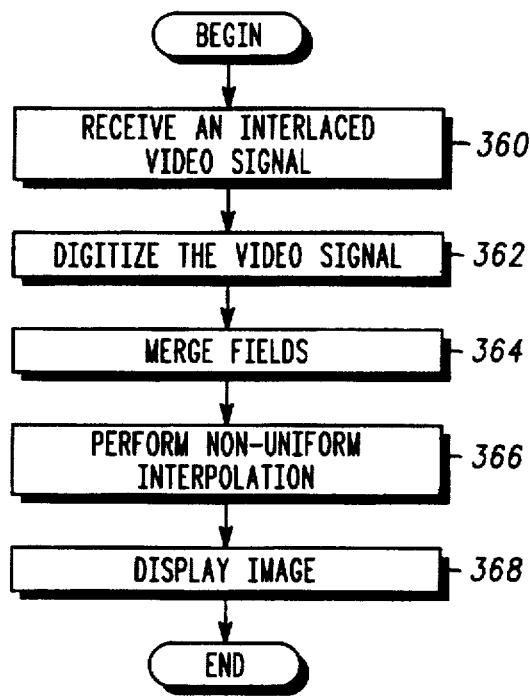
FIG. 16 illustrates a flow diagram of a method of processing an interlaced video signal that in accordance with one embodiment of the present invention.

FIG. 16 illustrates a flow diagram of a method of processing an interlaced video signal to generate a high-resolution video signal. The video systems depicted in FIGS. 4–7 can be employed to perform this method. The method results in generating a high-resolution video signal having a greater number of scan lines than the interlaced video signal.

In box 360, an interlaced video signal having two consecutive fields is received. The interlaced video signal can be formatted according to conventional television transmission standards such as PAL, NTSC, or SECAM. In such a signal, one of the two consecutive fields has even scan lines and the other field has odd scan lines. In most circumstances, the interlaced video signal is a continuous signal which includes a sequence of more than two fields.

In box 362, the interlaced video signal is digitized to produce a digital video signal having a plurality of digitized fields corresponding to the two consecutive fields. Generally, there is a one-to-one correspondence between the fields of the interlaced video signal and the digitized fields. However, there are many applications of this method in which it is desirable to produce two or more digitized fields from a single interlaced field, for instance, when separately manipulating portions of an image represented by the interlaced field.

In box 364, the digitized fields are merged to produce a frame which includes the even scan lines and the odd scan lines. Merging fields typically entails storing a first received field and then combining it with a subsequently received field. However, the method presented herein is not limited to a particular process for merging fields.

Next, in box 366, non-uniform interpolation is performed between adjacent scan lines in the frame to generate the high-resolution video signal. The high-resolution video signal has a greater number of horizontal scan lines than the interlaced video signal.

In box 368, an image represented by the high-resolution video signal is displayed on a monitor, such as the monitor 76 depicted in FIGS. 4–7.

The steps in boxes 360–368 can be repeated to generate a plurality of frames, and thus a corresponding plurality of images. A motion picture, represented by the high-resolution video signal, can be rendered by letting each of the frames correspond to a different consecutive pair of the fields.

Figure 17:
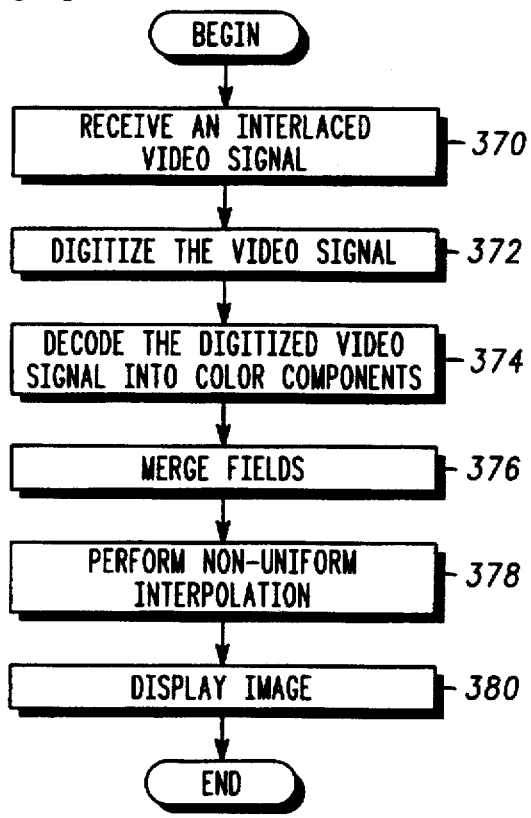
FIG. 17 illustrates a flow diagram of a method of processing an interlaced color video signal that is in accordance with a preferred embodiment of the present invention.

FIG. 17 illustrates a flow diagram of a method of processing an interlaced color video signal to generate a high-resolution video signal. The video systems depicted in FIGS. 4–7 can be employed to perform this method. In addition to the steps shown in FIG. 16, the method of FIG. 17 also includes the step given in box 374. In box 374, the digital video signal is decoded into a plurality of color component signals. The color component signals represent the components of a color space. For example, in the RGB color space, one of the color component signals represents the red space, another represents the green space, and a third represents the blue space.

The remainder of the steps in the method, depicted in boxes 376–380, are performed for each of the color components. Hence, continuing the example of the RGB color space, in box 376, two consecutive red fields are merged to produce a red frame that includes both even and odd scan lines. Likewise, two consecutive green fields are merged to produce a green frame, and two consecutive blue fields are merged to produce a blue frame. In box 378, for each color, non-uniform interpolation is performed between adjacent scan lines in the respective component frame. The resulting interpolated pixels of the color components form a high-resolution video signal which represents the color space. The high-resolution video signal has a greater number of horizontal scan lines than the original interlaced video signal. In box 380, a color image, represented by the high-resolution video signal, is displayed on a monitor, such as the monitor 76 depicted in FIGS. 4–7.

The steps in boxes 370–380 can be repeated generate a plurality of frames, and thus a corresponding plurality of images. A color motion picture, represented by the high-resolution video signal, can be rendered by letting each of the frames correspond to a different consecutive pair of the fields.

Figure 18:
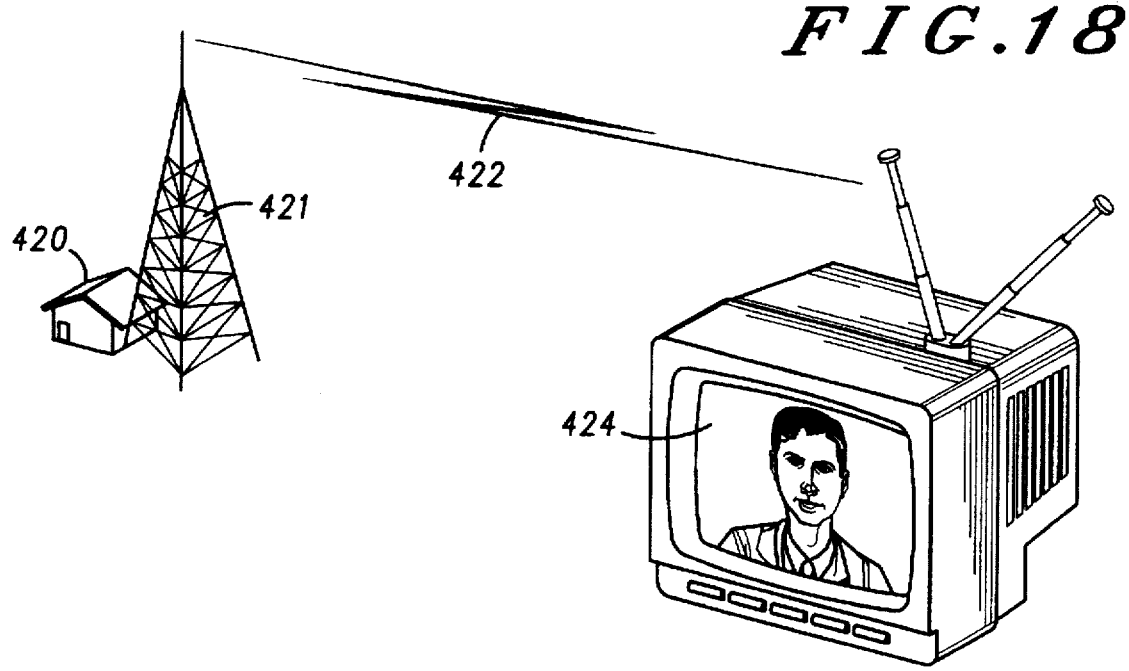
FIG. 18 illustrates a contextual diagram of a broadcasting system which employs at least one of the video systems depicted in FIGS. 4–7.

FIG. 18 illustrates a contextual diagram of a broadcasting system which employs at least one of the video systems depicted in FIGS. 4–7. The broadcasting system includes a broadcasting station 420 and a receiver 424. The broadcasting station 420 includes a transmitter 421 that emits a video signal 422 which travels via the atmosphere to the receiver 424. The transmitter 421 can include a ground based antenna, microwave relay, or satellite. The video signal can include broadcast information formatted according to conventional television transmission standards, such as NTSC, PAL, SECAM, or any variation of these standards. The receiver 424 includes an embodiment of the present invention and may be construed as any means for receiving the video signal 422 and displaying a transmitted image. For example, the receiver 424 could include a color television receiver, a projection screen TV, or a computer.

Figure 19:
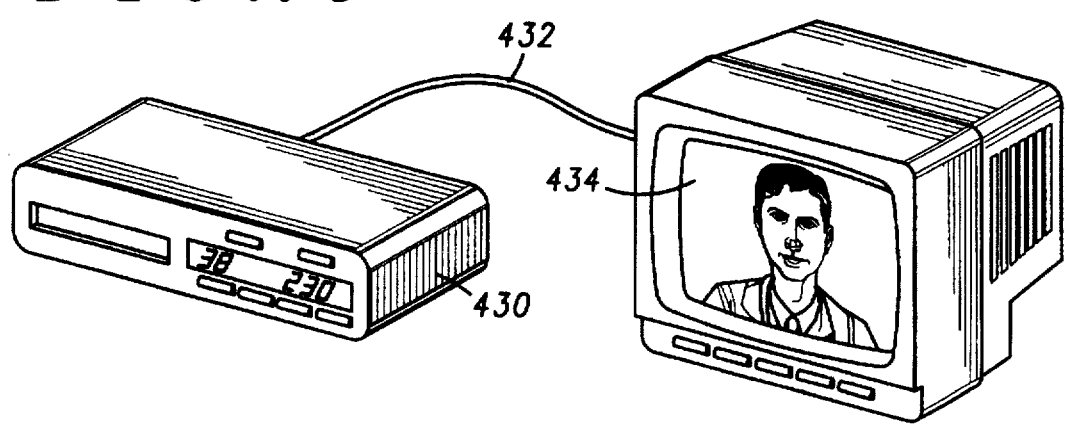
FIG. 19 illustrates a contextual diagram of a cable broadcasting system which employs at least one of the video systems depicted in FIGS. 4–7.

FIG. 19 illustrates a contextual diagram of a cable broadcasting system which employs at least one of the video systems depicted in FIGS. 4–7. The cable broadcasting system includes a video source 430, a transmission medium 432, such as a coaxial cable, and a receiver 434. The video source 430 includes a transmitter that emits a video signal which travels via the transmission medium 432 to the receiver 434. The video source 430 can include a video cassette player, video camera that plays back images, or a CD ROM. The video signal can include broadcast information formatted according to conventional television transmission standards, such as NTSC, PAL, SECAM, or any variation of these standards. The receiver 434 may be any means, which includes an embodiment of the present invention, for receiving the video signal and displaying a transmitted image. For example, the receiver 434 could include a television, a projection screen TV, or a computer.

Thus, there has been described herein a concept, as well as several embodiments including a preferred embodiment, of a method for generating a high-resolution video signal which includes a step of performing non-uniform interpolation. Because the various embodiments of the method as herein-described perform non-uniform interpolation to increase the number of scan lines in a video signal in real-time, they produce a video image of vastly improved quality.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of generating a high-resolution video signal, comprising the following steps:
   (a) receiving an interlaced video signal having two consecutive fields, one of the two consecutive fields having even scan lines and the other of the two consecutive fields having odd scan lines;
   (b) digitizing the interlaced video signal to produce a digital video signal having a plurality of digitized fields corresponding to the two consecutive fields;
   (c) merging the digitized fields to produce a frame which includes the even scan lines and the odd scan lines; and
   (d) performing non-uniform interpolation between adjacent scan lines in the frame to generate the high-resolution video signal having a greater number of horizontal scan lines than the interlaced video signal, wherein the non-uniform interpolation is based on a function $$y_i = c_{1ik}*d_k + c_{2ik}*d_{k+1}$$

wherein $y_i$ represents an interpolated pixel signal included in the high-resolution video signal, $d_k$ represents a first pixel signal from a kth scan line of the interlaced video signal, $d_{k+1}$ represents a second pixel signal from a k+1 scan line of the interlaced video signal, $c_{1ik}$ represents a first coefficient, $c_{2ik}$ represents a second coefficient, and i and k are integer indices.

2. The method of claim 1, further comprising the step of:
   repeating steps (a)–(d) to generate a plurality of frames.

3. The method of claim 2, wherein the interlaced video signal includes a sequence of more than two fields, and each of the frames corresponds to a different consecutive pair of the fields.

4. The method of claim 1, wherein the number of scan lines of the high-resolution video signal is selected from the group consisting of: 700 lines per frame, 800 lines per frame, 900 lines per frame, 1000 lines per frame, 1200 lines per frame, and 1920 lines per frame.

5. The method of claim 1, wherein $0 \leq c_{1ik} \leq 1$ and $0 \leq c_{2ik} \leq 1$.

6. The method of claim 1, wherein the non-uniform interpolation is based on a second function $$y_i = c_{1ik}*d_k + c_{2ik}*d_{k+1} + c_{3ik}*d_{k+2}$$

wherein $y_i$ represents the interpolated pixel signal, $d_k$, $d_{k+1}$, and $d_{k+2}$ represent three successive adjacent color space signals, $c_{1ik}$ represents a first coefficient, $c_{2ik}$ represents a second coefficient, $c_{2ik}$ represents a third coefficient, and i and k are integer indices.

7. The method of claim 1, further comprising the step of:
   displaying an image represented by the high-resolution video signal on a monitor.

8. The method of claim 1, wherein the non-uniform interpolation is based on a second function:

$$y_i = c_{1ik}*d_k + c_{2ik}*d_{k+1} + c_{3ik}*d_{k+2}$$

wherein $d_{k+2}$ represents a third pixel signal from a k+2 scan line of the interlaced video signal and $c_{3ik}$ represents a third coefficient.

9. The method of claim 1, wherein the number of scan lines in the high resolution video signal is programmable.

10. The method of claim 1, further comprising the step of decoding the digitized video signal into color components.

11. The method of claim 1, further comprising the step of converting the digitized video signal into a color space signal.

12. A method of generating a high-resolution video signal, comprising the following steps:
    merging a plurality of fields of an interlaced video signal to produce a frame;
    generating an interpolated pixel signal based on a function $$y_i = c_{1ik}*d_k + c_{2ik}*d_{k+1}$$

wherein $y_i$ represents the interpolated pixel signal, $d_k$ represents a first pixel signal from a kth scan line of the frame, $d_{k+1}$ represents a second pixel signal from a k+1 scan line of the frame, $c_{1ik}$ represents a first coefficient, $c_{2ik}$ represents a second coefficient, and i and k are integer indices; and
    generating the high-resolution video signal as a function of the interpolated pixel signal.

13. The method of claim 12, wherein the interlaced video signal includes a sequence of more than two fields, and the frame is derived from a consecutive pair of the fields.

14. The method of claim 12, wherein the number of scan lines of the high-resolution video signal is selected from the group consisting of: 700 lines per frame, 800 lines per frame, 900 lines per frame, 1000 lines per frame, 1200 lines per frame, and 1920 lines per frame.

15. The method of claim 12, wherein $0 \leq c_{1ik} \leq 1$ and $0 \leq c_{2ik} \leq 1$.

16. The method of claim 12, wherein the step of interpolating includes the sub-step of:
    generating the interpolated pixel signal based on a second function $$y_i = c_{1ik}*d_k + c_{2ik}*d_{k+1} + c_{3ik}*d_{k+2}$$

wherein $d_{k+2}$ represents a third pixel signal from a k+2 scan line of the interlaced video signal and $c_{3ik}$ represents a third coefficient.

17. The method of claim 12, further comprising the step of:
    displaying an image represented by the high-resolution video signal on a monitor.

18. The method of claim 17, wherein the image is displayed without time compressing the high-resolution video signal.

19. The method of claim 12, further comprising the step of:

digitizing the interlaced video signal.

20. The method of claim 12, wherein the step of generating includes the following sub-step:

generating the high-resolution video signal having a greater number of scan lines than the interlaced video signal.

21. The method of claim 12, wherein at least one of the first pixel signal and the second pixel signal comprises a color space signal.

22. A method of generating a non-interlaced video signal, comprising the following steps:

merging a plurality of fields of an interlaced video signal to produce a frame having a plurality of scan lines;

generating an interpolated pixel signal based on a function $$y+c_1*d_1+c_2*d_2+c_3*d_3,$$

wherein y represents the interpolated pixel signal, $d_1$ represents a first pixel signal of a first one of the scan lines, $d_2$ represents a second pixel signal of a second one of the scan lines, $d_3$ represents a third pixel signal of a third one of the scan lines, and $c_1$, $c_2$, and $c_3$ represent first, second, and third coefficients; and generating the non-interlaced video signal as a function of the interpolated pixel signal, the non-interlaced video signal having a greater number of scan lines than the interlaced video signal.

23. The method of claim 22, wherein the interlaced video signal includes a sequence of more than two fields, and the frame is derived from a consecutive pair of the fields.

24. The method of claim 22, wherein the number of scan lines of the high-resolution video signal is selected from the group consisting of: 700 lines per frame, 800 lines per frame, 900 lines per frame, 1000 lines per frame, 1200 lines per frame, and 1920 lines per frame.

25. The method of claim 22, wherein the interlaced video signal is selected from the group consisting of an NTSC signal and a PAL signal.

26. The method of claim 22, further comprising the step of:

digitizing the interlaced video signal.

27. The method of claim 22, wherein at least one of the first pixel signal, the second pixel signal, and the third pixel signal comprises a color space signal.

28. The method of claim 12, wherein the number of scan lines in the high resolution video signal is programmable.

29. The method of claim 22, wherein the number of scan lines in the non-interlaced video signal is programmable.

* * * * *